Figure 1:
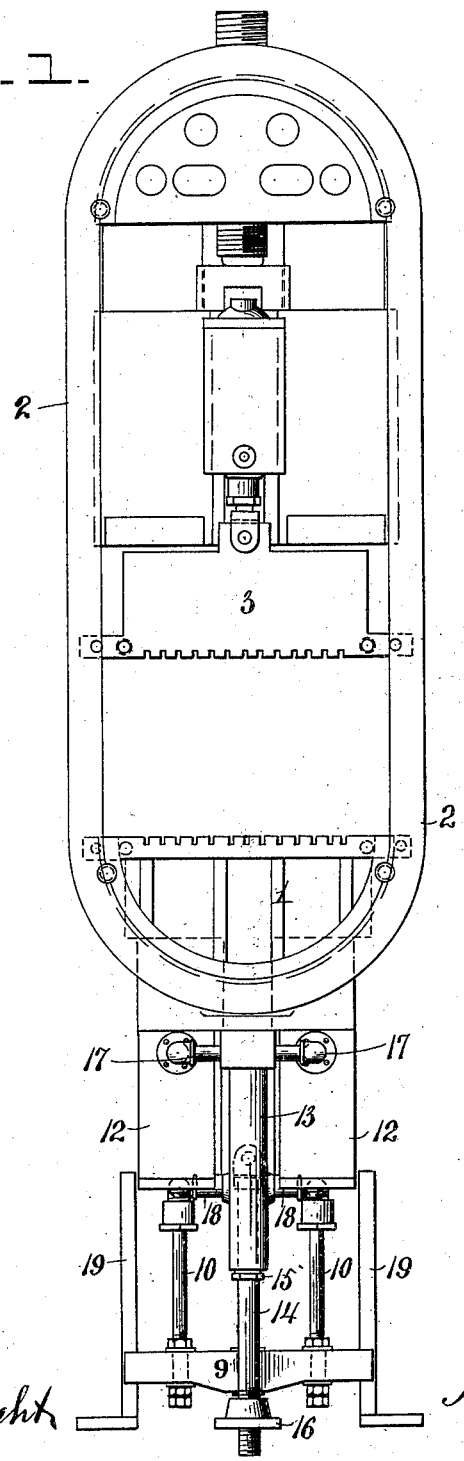

No. 750,313. PATENTED JAN. 26, 1904.
J. SHIPWAY.
COMPRESSOR.
APPLICATION FILED DEC. 2, 1899.
NO MODEL. 3 SHEETS—SHEET 1.

WITNESSES
W. E. Allen
Harry A. Knight

INVENTOR
Jesse Shipway.
By Knight Bros.
Attorneys.

No. 750,313. PATENTED JAN. 26, 1904.
J. SHIPWAY.
COMPRESSOR.
APPLICATION FILED DEC. 2, 1899.
NO MODEL. 3 SHEETS—SHEET 2.
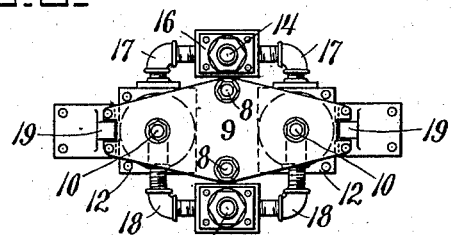
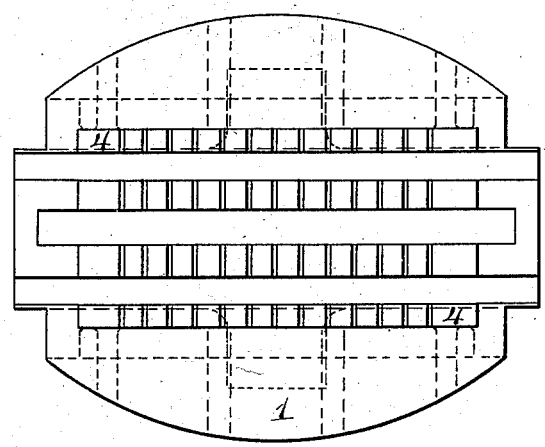
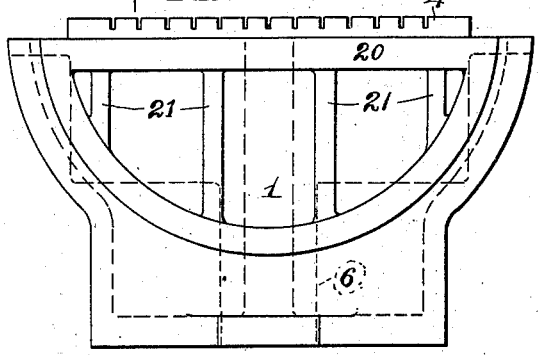
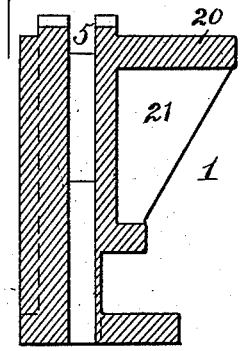
WITNESSES
INVENTOR
Jesse Shipway.
By Knight Bro
Attorneys.

No. 750,313. PATENTED JAN. 26, 1904.
J. SHIPWAY.
COMPRESSOR.
APPLICATION FILED DEC. 2, 1899.
NO MODEL. 3 SHEETS—SHEET 3.
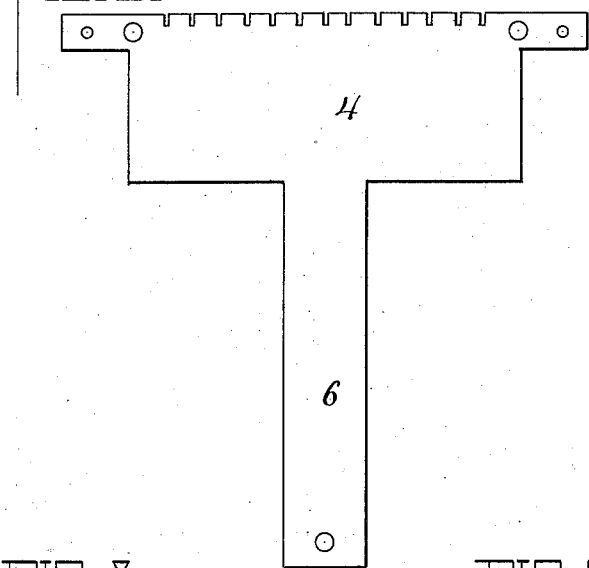
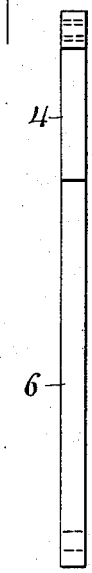
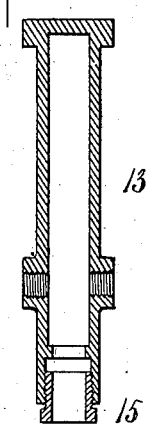
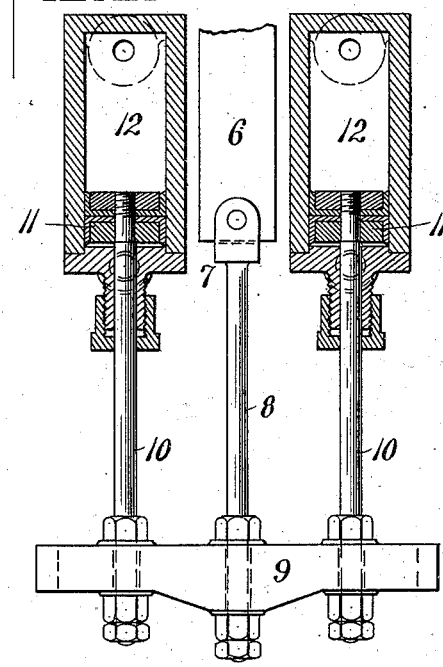
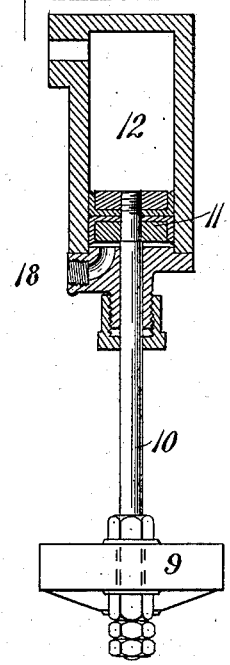
WITNESSES
INVENTOR
Jesse Shipway,
By Knight Bros
Attorneys.

No. 750,313.

Patented January 26, 1904.

UNITED STATES PATENT OFFICE.

JESSE SHIPWAY, OF MEMPHIS, TENNESSEE.

COMPRESSOR.

SPECIFICATION forming part of Letters Patent No. 750,313, dated January 26, 1904.

Application filed December 2, 1899. Serial No. 739,013. (No model.)

*To all whom it may concern:*

Be it known that I, JESSE SHIPWAY, a citizen of the United States, and a resident of Memphis, in the county of Shelby and State of Tennessee, have invented certain new and useful Improvements in Compresses, of which the following is a specification.

My invention relates to compresses employed for the purpose of condensing bales of cotton and other like fibrous material in the direction of both its transverse directions, as described in United States Letters Patent No. 590,158, granted to Stonewall R. Montgomery September 14, 1897, in which vertically-sliding plates are employed for the purpose of reducing the lateral dimension of the compression-chamber to confine the bale in the direction of its first compression while the second compression is taking place.

My invention consists in providing means movable upwardly to form in connection with the lower platen a compression-space of reduced transverse dimension and adapted to shift the material to bring it into said reduced space and present a narrower side of the material to the platens.

It consists, further, in the parts and combination of parts, as will be hereinafter described, and pointed out in the appended claims.

In the accompanying drawings, Figure 1 is a front elevation of a common form of compress to which my invention is shown applied for the purpose of illustration. Fig. 2 is a bottom plan view of the same. Figs. 3, 4, and 5 represent a plan, side elevation, and a sectional view of the moving platen of a press constructed for the application of the features of my invention. Fig. 6 is a side elevation of one of the sliding plates. Fig. 7 is an edge view of the same. Figs. 8 and 9 are vertical sectional views through the controlling-cylinders and lower cross-head in two planes at right angles. Fig. 10 is a detail view of one of the compressor's supply-cylinders and the telescoping pipe connecting therewith.

1 represents the lower or movable platen in a common form of compress, which is raised and lowered in a well-known manner by links which connect above the bed-plate with the piston of the main power-cylinders.

2 represents links, and 3 the upper platen.

In order to restrict the horizontal dimension of the space in which the compression takes place after a bale has been compressed in one direction, vertically-sliding plates 4 are mounted in vertical slots 5 of the platen 1. (See Figs. 3, 4, and 5.) These plates have downwardly-projecting rods 6, which connect at 7 with the connecting-rod 8, a cross-head 9, the ends of which are connected to the piston-rods 10, carrying the pistons 11, which work in controlling-cylinders 12. By admitting fluid-pressure above or below the pistons 11 the cross-head 9 is moved upwardly or downward, and the movement of the plate 4 relatively to the platen 1 may thus be controlled at will.

To supply fluid-pressure to the cylinders 12, I employ pressure-supply cylinders 13, preferably located in a plane transverse to the plane of the cylinders 12 and connected, respectively, to the upper ends of both cylinders and to the lower ends of both cylinders, so that the fluid-pressure communicated from one of the cylinders 13 through one of the cylinders 12 above their pistons 11 will cause the plates 4 to be forced upward within the slots 5 of the platen 1, while fluid-pressure communicated through the other cylinder 13 will pass to the other side of both pistons 11 and cause the plates 4 to be projected above the surface of the platen 1.

In order to communicate fluid-pressure to either of the cylinders 13 at will without regard to the position of the platen 1 or whether it be moving or at rest, each cylinder 13 is provided with a telescope supply-pipe 14, which works through a packing-gland 15 in the lower end of the said cylinder, while the lower ends of the pipes 14 are permanently secured at 16 upon an immovable part of the machine. It is to be understood that fixed ends of the pipes 14 have independent connections through controlling-valves with a suitable source of fluid-pressure and with exhaust-ports, through which fluid may escape from one of the cylinders 13 while pressure is supplied to the other.

17 represents the connections on a cylinder to the upper ends of the cylinder 12, while 18 represents similar connections from the other cylinder 13 to the lower ends of the cylinder 12.

19 represents vertical guides or tracks for the cross-head 9.

In order to strengthen the platen 1, it is provided with laterally-projecting stiffening-ribs 20 and vertical supporting-brackets 21, as shown in Figs. 3, 4, and 5.

The operation of my invention is as follows: The bale is placed upon the movable platen 1, and the link 2 is then raised in the ordinary manner. The link carries with it the movable platen 1, and the bale is compressed between the movable platen 1 and fixed or stationery platen 3. When the movable platen is raised, the cylinders 12, plates 4, cross-head 9, and the cylinders 13 are carried up with it, and by means of the pipes 14, which telescope with the cylinders 13, a continuous communication between the mechanism which operates the plates 4 and the fluid-supplying devices is provided. After the bale has been first so compressed and the moving bottom platen dropped the pistons 11 are raised by admitting fluid from one of the cylinders 13 beneath the said pistons, which elevates both sliding plates 4 relative to the platen, allowing the bale to drop between them as the platen 1 descends. After the sliding plates 4 have been forced upward to a proper distance the fluid is locked in lower end of cylinder 12 and is thus held until moving plates 4 strike the upper platen or bed-plate 3 and a sufficient outward pressure has been put upon the bale to hold the plates elevated, when the fluid is then released, allowing plates 4 to descend until required density has been reached. After the bale has been compressed the second time the plates are then forced downwardly into the slots of the platen by admitting fluid above the pistons 11 from the other cylinder 13, the fluid being released from the lower part of the cylinder 12 in such a manner as to form a cushion to prevent the plates 4 dropping heavily, which causes them to break or endanger other parts of the machinery. This arrangement does away with the double-acting steam-cylinders heretofore used, and by having the plates upon the lower movable platen the bale is turned by the elevation of the plates. The arrangement of the plates on the movable platen renders possible relative movement between the plates and the moving platen upon the lowering of the latter. The plates are also moved simultaneously with the platen without throwing in the operating mechanism of the plates.

Having thus described my invention, the following is what I claim as new therein and desire to secure by Letters Patent:

1. In a cotton-compress, the combination with a pair of platens, of sides or plates adapted to move independently of the platens, forming a compression-space and adapted to move the bale to a position to receive a second compression, and mechanism moving the sides or plates.

2. In a cotton-compress, the combination of a pair of platens, and plates or sides movable upwardly to form a reduced compression-space in connection with said platens, and to move the bale into a position to receive a second compression, and mechanism for moving said sides or plates.

3. In a cotton-compress, the combination of a lower platen, plates movable upwardly to form therewith a compression-space of reduced transverse dimension and adapted to shift the material to bring it into said reduced space and present a narrower side of the body of the material to the platen, and mechanism for moving said plates.

4. In a cotton-compress, the combination of a lower platen, means mounted on the lower platen and movable upwardly to form a compression-space, and mechanism for moving said means.

5. In a cotton-compress, the combination of a lower platen, plates mounted on said platen and movable upwardly to form a compression-space, and mechanism for moving said plates.

6. In a cotton-compress, the combination of a lower movable platen, plates mounted on and carried by the said platen and movable upwardly to form a compression-space.

7. In a cotton-compress, the combination of a lower movable platen, plates mounted on and carried by the said platen and movable upwardly to form a compression-space, and means also carried by the platen for moving said plates.

8. In a cotton-compress, the combination of a lower movable platen, means mounted on and carried by said platen, and movable upwardly to form a compression-space, and fluid-operated means also mounted on and carried by said platen operating said space-forming means.

9. In a cotton-compress, the combination of a lower movable platen, plates mounted on and carried by said platen, and movable upwardly to form a compression-chamber; and fluid-operating means also mounted on and carried by the platen, operating the movable plates.

10. In a cotton-compress, the combination of a lower movable platen, plates mounted on and carried by said platen, and movable upwardly to form a compression-space, a piston-cylinder also moving with the platen, a piston-head, connection between the piston-head and plates and connection between the piston-cylinders and a fluid-supply.

11. In a cotton-compress, the combination of a moving platen, means mounted on and carried by the platen, and adapted to be moved from and to the plane of the platen to form a compression-space, and means operating the compression-space-forming means also moving with the platen.

12. In a cotton-compress, the combination of a movable platen, sliding plates mounted on and carried by the platen, a piston-cylinder also mounted on and carried by the platen, a piston-head, connections between piston-head and the sliding plates, and a fluid-conducting cylinder also mounted on and carried by the platen and having telescopic connection with a fluid-supply pipe.

13. In a cotton-compress, the combination of a movable platen, sliding plates mounted on and carried by the platen, a plurality of piston-cylinders also mounted on and carried by the platen, a piston-head in each cylinder, connections between the piston-heads and the sliding plates, and two fluid-conducting cylinders also mounted on and carried by the platen and having telescopic connections with the supply-pipe.

14. In a cotton-compress, the combination of a movable platen, sides carried thereby adapted to move the material to a position to receive a second compression by the compress, and mechanism for moving the sides.

15. In a cotton-compress, the combination of a lower platen and means extending through said platen for moving a bale to a position to receive a second compression by the compress and said means forming a reduced compression-chamber with said platen.

16. In a cotton-compress, the combination of a lower movable platen and plates adapted to reciprocate extending through the platen.

17. In a cotton-compress, the combination of a lower platen and plates adapted to move upwardly in relation to the platen to move the bale to a position to receive a second compression by the compress, and said plates forming with the platen a compression-chamber in which the second compression takes place.

18. In a cotton-compress, the combination of upper and lower platens, and sides mounted to move upwardly relatively to the lower platen, to form with it a compression-chamber of reduced transverse dimension; said sides being movable relatively to the lower platen as the latter moves upward to effect compression in the reduced chamber.

19. The herein-described platen for the compressors having relatively movable plates, formed with a vertical slot 5, and with outwardly-extending stiffening-rib 20 beyond the wall of said slot 5, and with the vertical strengthening-bracket 21 beneath the said rib, substantially as and for the purpose set forth.

20. In combination with a compress, plates or sides mounted upon the movable platen of the compress and movable into and out of position thereon to provide a compression-chamber of reduced dimension; substantially as herein explained.

21. In combination with a compress having a lower movable platen, plates or sides mounted upon said lower movable platen and movable thereon into and out of position to provide, in connection with said platen, a compression-chamber of reduced horizontal dimension, and pressure-cylinders also mounted upon and moving with said lower moving platen, and having pistons connected with the sides or plates for moving the latter relatively to the platen into and out of their position aforesaid.

JESSE SHIPWAY.

Witnesses:
  H. S. KNIGHT,
  EDWIN S. CLARKSON.